Jan. 10, 1961     J. F. WAGNER     2,967,437
TRANSMISSION SELECTOR AND SHIFTER MEANS
Filed Sept. 11, 1958
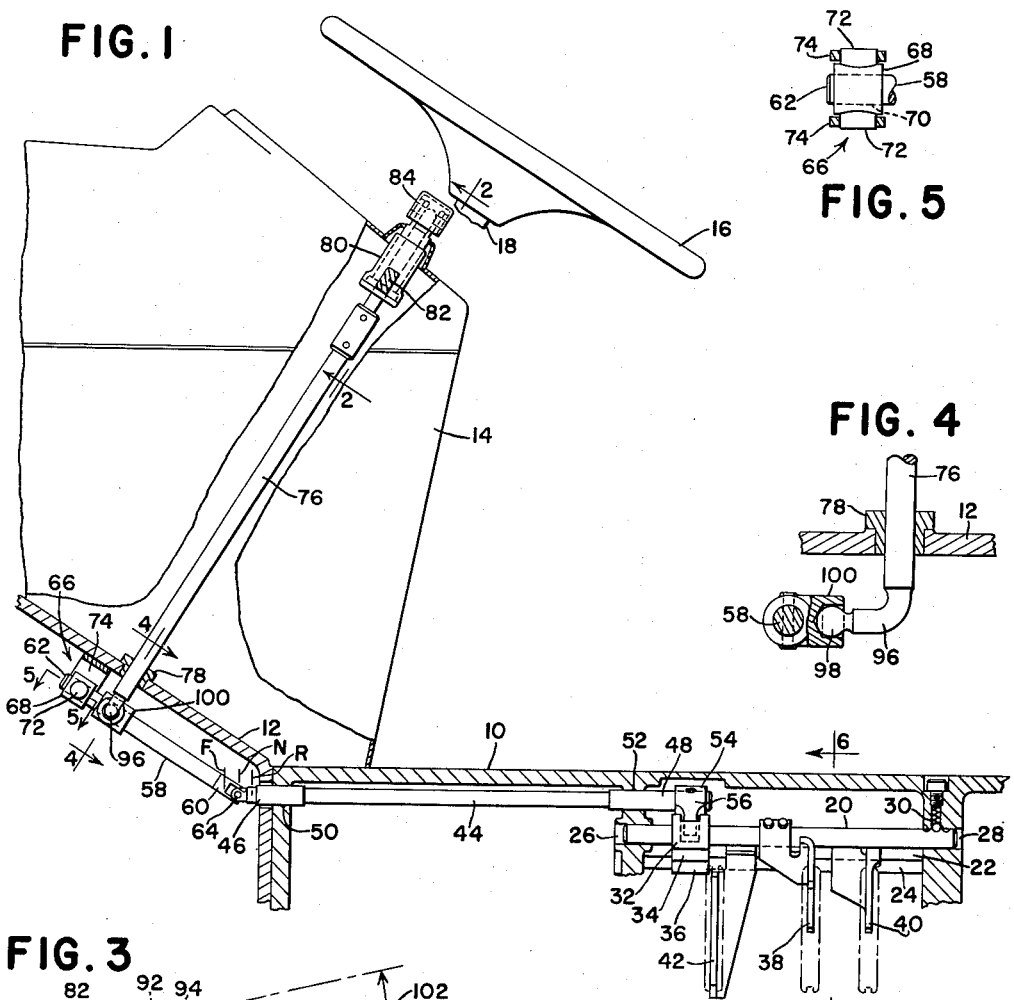
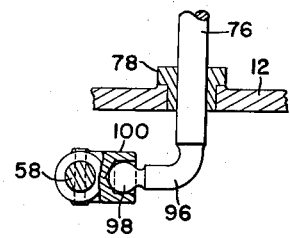
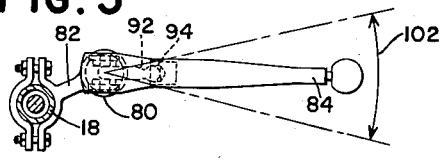
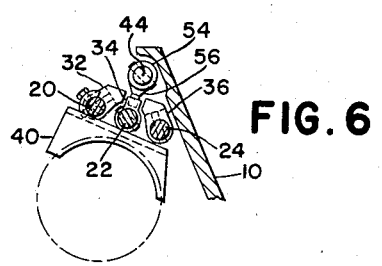
*INVENTOR.*
J. F. WAGNER

United States Patent Office 2,967,437
Patented Jan. 10, 1961

2,967,437

TRANSMISSION SELECTOR AND SHIFTER MEANS

Joseph F. Wagner, Dubuque, Iowa, assignor to Deere & Company, Moline, Ill., a corporation of Delaware Filed Sept. 11, 1958, Ser. No. 760,383

1 Claim. (Cl. 74—473)

This invention relates to control mechanism in the form of selector and shift means for a change-speed transmission for vehicles and the like.

The invention finds particular utility in its application to what is known as remote-control selection and shifting of change-speed elements in a transmission, typical of the broad class of which is the type of shift or selector lever mounted adjacent to the vehicle steering column for angular movement about and for shifting along an axis parallel to that of the steering column. As is well known to those versed in the art, the remote control arrangement involves extended linkages, shafts and the like, because of the location of the transmission relatively remote from the location of the shift and selector lever. Heretofore, many expedients have been resorted to for solving the attendant problems, but many of these are relatively complicated, somewhat expensive and normally entail certain compromises.

According to the present invention, a novel remote control arrangement is provided, featuring simplicity, relatively few moving parts and provision for accommodating changes in position without affecting the fundamental accuracy and efficiency of the shift mechanism. The invention specifically features a control mechanism in which a pair of angularly related universally-joint-connected shafts are interposed in the linkage, one of the shafts being supported adjacent to both ends for fore-and-aft shifting as well as for angular movement about its axis and the other shaft being supported at one end solely by its universal joint connection to the first shaft and at its other end by a floating bearing which accommodates changes in angle between the two shafts as they shift fore-and-aft for effecting the shift function. Still further advantages of the invention reside in the connection of the actuating means to accommodate the changes in angle just referred to, as well as simplicity, economy and ease of assembly, use and maintenance.

The foregoing and other important features and desirable objects, inherent in and encompassed by the invention, will become apparent as a preferred embodiment thereof is disclosed in detail in the ensuing description, taken in conjunction with the accompanying sheet of drawings, the several figures of which are described below.

Fig. 1 is a side elevation, partly in section and with portions broken away, illustrating the overall arrangement.

Fig. 2 is a fragmentary rear view as seen generally along the line 2—2 of Fig. 1.

Fig. 3 is a plan view of the structure shown in Fig. 2.

Fig. 4 is an enlarged fragmentary section as seen generally along the line 4—4 of Fig. 1.

Fig. 5 is an enlarged fragmentary section as seen generally along the line 5—5 of Fig. 1.

Fig. 6 is a section as seen along the line 6—6 of Fig. 1.

The vehicular environment chosen for purposes of illustration may be taken as representative of a typical vehicle having supporting structure, here made up of portions of a transmission case 10, an upwardly and forwardly extending rigid frame portion 12 and housing structure 14 which supports conventional instruments, such as an oil pressure gauge, ammeter (not shown) etc. This structure is sometimes known as a console, especially when applied to a tractor or similar vehicle. In those cases, a steering wheel, such as shown here at 16, is mounted at a convenient angle and is supported by a steering column or post 18, a portion of which is broken away in Fig. 1 to expose the upper parts of the shift and selector mechanism.

The particular details of the change-speed transmission are not material, since the invention may be applied to any transmission having a plurality of selector receivers which are associated with the changeable components in the transmission. In the present case, the transmission is disclosed as having three parallel fore-and-aft shift rails 20, 22 and 24, appropriately slidably supported in the transmission case as at 26 and 28 and detented as at 30 for accuracy in positioning. These rails, as is conventional, have selector receivers 32, 34 and 36 rigidly affixed respectively thereto, and these are provided with transverse slots, which in the neutral positions of the receivers are transversely alined. The rails further respectively carry, rigidly affixed respectively thereto, shifter forks 38, 40 and 42 which may be conventionally connected to longitudinally shiftable components in the transmission, which will be clear to those versed in the art, without further elaboration.

Part of the improved shift and selector means comprises a fore-and-aft rear shaft 44 having front and rear ends 46 and 48 respectively. Means are provided for supporting this shaft adjacent to its opposite ends for fore-and-aft sliding along as well as for rocking about its axis, and in the present case this means may take the form of front and rear bearings 50 and 52, respectively. Rigidly secured to the rear end 48 of the shaft 44 is a selector 54 which has a depending tail portion 56 receivable in the normally transversely alined slots of the receivers 32, 34 and 36. Hence, when the shaft 44 is rocked about its axis, the tail 56 traverses the slots and the selection of one or the other of the receivers to be shifted is achieved by stopping the shaft 44 in an angular position with the tail 56 received in the slot of the selected receiver. For example, as shown in Fig. 6, the tail 56 on the selector is engaged with the selector receiver 34 and consequently fore-and-aft shifting of the shaft 44 will incur fore-and-aft shifting of the middle rail 22.

A front shaft 58 has a rear end 60 closely adjacent to the front end 46 of the rear shaft 44 and inclines upwardly and forwardly from the shaft 44 to a front end portion 62. The rear end 60 of the front shaft 58 and the front end 46 of the rear shaft 44 are flexibly interconnected by a universal joint 64. This joint serves not only to interconnect the two shafts for fore-and-aft movement and rocking in unison but also supports the rear end of the shaft 58. The front end 62 of the shaft 58 is supported by floating bearing means designated in its entirety by the numeral 66. The details of this bearing are best shown in Fig. 5, wherein it will be seen that it includes a central part 68 having a fore-and-aft bore 70 in which the front part of the shaft 58 is slidably carried. The part 68 is in the form of a trunnion block having opposite transverse trunnions 72 which are rockably received in apertured ears 74 of a depending support carried by the under surface of the structure part 12. The purpose of the floating nature of the bearing 66 is to accommodate changes in the angle of the shaft 58 as the shafts 58 and 44 are moved back and forth. This will be clear when it is considered that as the shaft 44 moves rearwardly, for example, it causes also rearward movement of the shaft 58. In short, the center of the universal joint, indicated at position N would shift rearwardly to a position indicated by the letter R. When the two shafts are shifted forwardly, the center of the universal joint would move forwardly to the position indicated by the letter F. Since this point (the center of the universal joint) must remain on the fore-and-aft axis of the shaft 44, it follows that the angle between the two shafts 44 and 48 will change. This will be clear when imaginary lines are drawn from the transverse axis of the trunnion pivot 72 through the respective intersections of the indicating lines F and R with the axis of the shaft 44.

The means for rocking the shaft 58 and also for shifting it fore-and-aft, and consequently for imparting these movements to the rear shaft 44, includes an upwardly and rearwardly inclined shaft 76 journaled and slidably supported adjacent its lower end by a bearing 78 in the structure part 12 and similarly supported at its upper end in a bearing 80 having a bracket part 82 suitably rigidly connected to the adjacent steering column 18 (Figs. 2 and 3).

A lever or handle 84 is pivotally mounted on a fore-and-aft pivot pin 86 on a part 88 journaled in the bracket 80 and turnable about the axis of the shaft 76, and the lever 84 may thereby be rocked upwardly and downwardly as indicated by the directional arrow 90 in Fig. 2. The shaft 76 has an upper end extension which is bent at 92 and received in the lever 84 by a ball and socket connection 94 so that when the lever or handle is rocked up and down, the shaft 76 is shifted upwardly and downwardly along its axis. The lower end of the shaft 76 is bent or formed as a crank 96 (Fig. 4) and has a ball and socket connection 98 with an arm 100 that is keyed to the shaft 58 closely proximate the floating bearings 66. Hence, up and down movement of the shaft 76, or movement thereof along its axis, creates turning of the shaft 58 and this turning is of course transmitted through the universal joint 64 to the rear shaft 44 for effecting the selection among the selector receivers 32, 34 and 36.

Because of the ball and socket connection 94 between the upper end extension 92 of the shaft 76 and the lever or handle 84, the shaft 76 may be turned about its axis in opposite directions and through a range indicated by the directional arrow 102 in Fig. 3. This motion is transmitted into fore-and-aft motion of the shaft 58 and that in turn causes fore-and-aft movement of the rear shaft 44 for shifting the selected selector receiver 32, 34 or 36, as the case may be. The connection between the lever 84 and the shaft 58 is sufficiently articulate, and the crank arm 96 and ball and socket arm 100 lie sufficiently close to the tranverse pivot 72 of the floating bearing 66, as to readily accommodate the linkage to changes in angle of the shaft 58 as it moves fore-and-aft.

As already indicated, the construction is simple and includes relatively few moving parts; therefore, it is easy to operate and extremely unlikely to malfunction. Features and advantages not specifically outlined will readily occur to those versed in the art, as will modifications and alterations in the preferred embodiment disclosed, all of which may be achieved without departure from the spirit and scope of the invention.

What is claimed is:

In a vehicle having support structure and a change-speed transmission including a plurality of selector receivers mounted for individual fore-and-aft shifting from a neutral position of transverse alinement, the improvement residing in selector and shifter means comprising: a fore-and-aft rear shaft having front and rear ends respectively remote from and adjacent to the receivers; front and rear means mounting said shaft on the support structure for fore-and-aft movement along and for rocking about its axis; selector means fixed to the rear end of said shaft and engageable with any one of the receivers upon rocking of said shaft and for shifting the selected receiver upon subsequent fore-and-aft shifting of said shaft; a front shaft having a rear end adjacent to the front end of the rear shaft and extending forwardly at an angle to said rear shaft to a front end; universal joint means interconnecting the rear end of the front shaft and the front end of the rear shaft; bearing means mounting the front end of the front shaft for rocking about its axis to transmit angular movement to the rear shaft and for fore-and-aft shifting along its axis to shift the rear shaft fore-and-aft, said bearing means including a trunnion block having a bore therein coaxially slidably receiving the front end of the front shaft and a pair of oppositely outwardly extending trunnions coaxial on an axis transverse to the axis of said bore, and a bracket carried by the support structure and carrying the trunnion block via said trunnions to enable said block to rock about the trunnion axis so as to accommodate changes in the angle of said front shaft incident to fore-and-aft shifting thereof; and means for rocking and shifting said front shaft.

References Cited in the file of this patent

UNITED STATES PATENTS

| | | |
|---|---|---|
| 2,163,507 | Wolchek | June 20, 1939 |
| 2,252,080 | Lapsley | Aug. 12, 1941 |
| 2,252,158 | Bixby | Aug. 12, 1941 |
| 2,390,711 | Holmstrom | Dec. 11, 1945 |
| 2,762,236 | Adloff | Sept. 11, 1956 |